US008688279B2

(12) United States Patent
Nilsson et al.

(10) Patent No.: US 8,688,279 B2
(45) Date of Patent: Apr. 1, 2014

(54) ENERGY STORAGE AT ELEVATED VOLTAGE IN A RADAR LEVEL GAUGE

(75) Inventors: Leif Nilsson, Linköping (SE); Thomas Lundin, Borensberg (SE)

(73) Assignee: Rosemount Tank Radar AB, Goteborg (SE)

( * ) Notice: Subject to any disclaimer, the term of this patent is extended or adjusted under 35 U.S.C. 154(b) by 556 days.

(21) Appl. No.: 12/603,048

(22) Filed: Oct. 21, 2009

(65) Prior Publication Data
US 2011/0093129 A1  Apr. 21, 2011

(51) Int. Cl.
G05D 11/00   (2006.01)

(52) U.S. Cl.
USPC .............................. 700/286; 342/124; 370/311

(58) Field of Classification Search
USPC .............................. 700/286; 342/124; 370/311
See application file for complete search history.

(56) References Cited

U.S. PATENT DOCUMENTS

| 5,691,629 | A | 11/1997 | Belnap | 323/266 |
|---|---|---|---|---|
| 6,014,100 | A * | 1/2000 | Fehrenbach et al. | 342/124 |
| 6,107,957 | A * | 8/2000 | Cramer et al. | 342/124 |
| 6,300,897 | B1 * | 10/2001 | Kielb | 342/124 |
| 6,972,584 | B1 | 12/2005 | Ferreira | 324/765 |
| 7,307,582 | B2 * | 12/2007 | Griessbaum et al. | 342/124 |
| RE40,128 | E * | 3/2008 | Kielb | 342/124 |
| 7,372,397 | B2 | 5/2008 | Nilsson | 342/124 |
| 2005/0168379 | A1 * | 8/2005 | Griessbaum et al. | 342/124 |
| 2006/0001736 | A1 * | 1/2006 | Monroe | 348/14.02 |
| 2008/0095261 | A1 | 4/2008 | Van Putten et al. | 375/295 |
| 2008/0151800 | A1 * | 6/2008 | Rofougaran et al. | 370/311 |
| 2010/0056956 | A1 * | 3/2010 | Dufresne et al. | 600/586 |

FOREIGN PATENT DOCUMENTS

| EP | 1478083 | 11/2004 |
|---|---|---|
| WO | WO 2006130087 | 12/2006 |

OTHER PUBLICATIONS

International Search Report for related PCT/SE2010/051132 filed Oct. 20, 2010 and date of completion of search Jan. 27, 2011; 5 pages.
Written Opinion of the International Searching Authority for PCT/SE2010/051132 filed Oct. 20, 2010; date of completion of this opinion Jan. 28, 2011; 6 pages.

* cited by examiner

*Primary Examiner* — Mohammad Ali
*Assistant Examiner* — Anthony Whittington
(74) *Attorney, Agent, or Firm* — Westman, Champlin & Koehler, P.A.

(57) ABSTRACT

A power management circuitry for a radar level gauge including a first voltage converter, having a low-voltage end for receiving a drive voltage from a power interface and a high-voltage end for supplying an intermediate voltage higher than the required operating voltage, a temporary energy store arranged to be charged by the intermediate voltage, a second voltage converter, having a high-voltage end for receiving an input voltage from the energy store, and a low-voltage end for providing the operating voltage lower than the input voltage. By storing energy at a higher voltage, a different type of energy store (e.g. low capacity capacitor) may be used. As a consequence, the cost and start-up time of the energy store is significantly reduced.

15 Claims, 2 Drawing Sheets

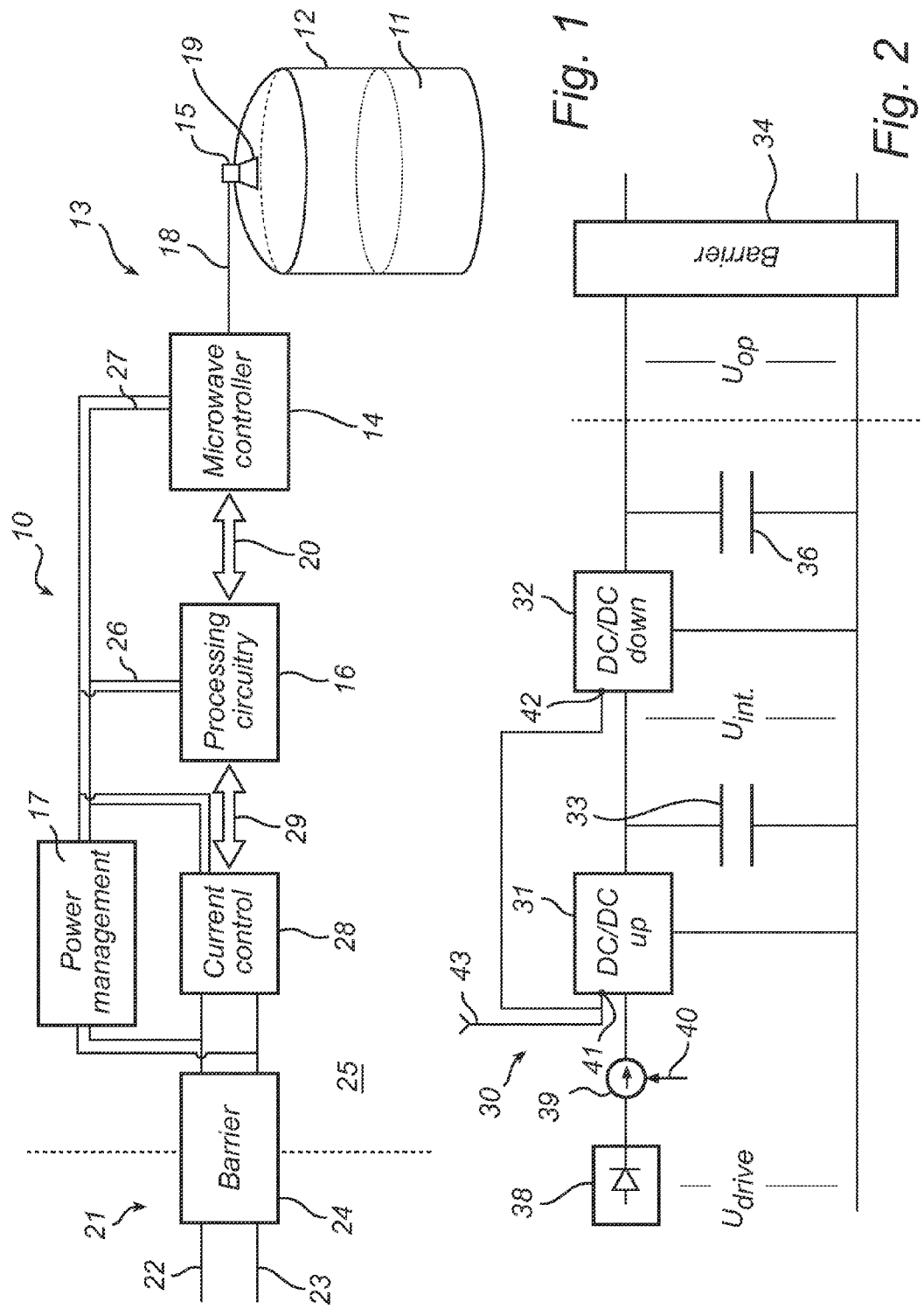

ENERGY STORAGE AT ELEVATED VOLTAGE IN A RADAR LEVEL GAUGE

FIELD OF THE INVENTION

The present invention relates to a radar level gauge system using microwaves for measuring a level of a surface of a product in a container. More specifically, the invention relates to energy storage in such a gauge.

BACKGROUND OF THE INVENTION

Radar level gauges are suitably used for making non-contact measurements of the level of products such as process fluids, granular compounds and other materials. An example of such a radar level gauge can include a microwave unit for transmitting microwaves towards the surface and receiving microwaves reflected by the surface, processing circuitry arranged to communicate with said microwave unit and to determine said level based on a relation between transmitted and received microwaves, an interface for connecting said processing circuitry externally of said radar level gauge, and a power management circuitry providing said microwave unit and said processing circuitry with operating power.

In order to ensure a satisfactory signal level of the received echo, the emitted microwaves must have a sufficient power level. The processing of received signals also requires significant power, and in some cases the clock frequency of the processor is increased during the processing in order to enable high speed calculations. In combination, this results in an increased demand of power during certain parts of the measuring cycle. The power requirements are especially high for Frequency Modulated Continuous Wave (FMCW) systems. However, the provision of power is relatively difficult to achieve in practice, since energy is normally a scarce resource in the above-discussed type of gauges.

In particular, limited available power is a problem in systems using a two wire feeding system. Radar level gauges for measuring of a level in a tank, and other types of process sensors, are typically connected with a two-wire interface, where only two lines serve to both supply the sensor with limited power and to communicate a measured and processed measuring signal. The interface can be a 4-20 mA industrial loop with superimposed digital communication, or another two-wire fieldbus, such as Fieldbus Foundation (FF) or Profibus. Other possible interfaces include a four-wire interface, where two lines provide power, and two wires communicate measurement signals. In case of a 4-20 mA loop, the available power is thus dependent upon the signal value of the gauge, so that during periods with low signal value (e.g. around 4 mA) only a very limited power is available. Even during periods of high signal value (e.g. around 20 mA) the available power may not be sufficient to power the processing circuitry and the microwave emitter during a measurement cycle.

For this reason, power management in some form may be required, to distribute the available power between different components and over time. Such power management may include storage of energy in some kind of energy storage device, so that this energy can be used to boost the available power during periods of increased power requirements. The energy storage can take place in specifically designated standby periods, following each measurement cycle, or take place throughout the measurement cycle, during periods of low activity.

In the case where measurements are made in a tank containing explosive gas or liquids, or in any other situation where the sensor is located in an explosion endangered area, there is also an issue of explosion protection. Normally, either the installation is made explosion proof by some kind of encapsulation, or its outside electrical connection is made intrinsically safe (IS). The latter case requires that input power, voltage and current do not exceed levels stated by safety regulations (IS requirements). This is ensured by a so called electrical barrier, arranged in the interface to the intrinsically safe area.

As it is undesirable to capsulate the microwave electronics, the measurement device should operate at a relatively low voltage in order to comply with IS regulations. At such low voltages, energy storage is rendered inefficient as it requires large and slow capacitors. Typically, the minimum energy store capacitance falls within the range covered by aluminium electrolyte capacitors only.

An aluminium electrolyte capacitor looses roughly 20% of its initial capacity due to low temperature (−40 degrees C.) and 20% due to ageing (5000 hours). This may be compensated for at the expense of size, price and a significantly increased start-up time. In addition, if an aluminium electrolyte capacitor is used in a position where a major part of its energy is discharged during the system's active cycle, this will also significantly decrease the initial capacitance value.

Another major disadvantage with using large capacitors is that the life time is reduced dramatically when exposed to high temperatures.

Document U.S. Pat. No. 6,972,584 discloses a power decoupling circuit intended for an ultrasonic level gauge. In order to enable operation of the device, the voltage provided by the current loop is elevated by a step-up converter. Energy storage is also performed at this higher voltage level.

SUMMARY OF THE INVENTION

It is an object of the present invention to address the above problems, and to provide improved energy storage in a radar level gauge without violating safety regulations (e.g. IS requirements).

This object is achieved with a radar level gauge, a power supply circuit and a method according to the appended claims.

According to a first aspect of the present invention, there is provided a radar level gauge comprising a microwave unit for transmitting microwaves into the tank, and receiving a reflection from the tank, processing circuitry connected to the microwave unit and arranged to determine the level based on a relation between transmitted microwaves and the reflection, a power interface for connecting the radar level gauge to an external power supply, and power management circuitry arranged to provide power at an operating voltage to the microwave unit and the processing circuitry. The power management circuitry includes a first voltage converter, having a low-voltage end for receiving a drive voltage from the power interface and a high-voltage end for supplying an intermediate voltage higher than the operating voltage, a temporary energy store arranged to be charged by the intermediate voltage, a second voltage converter, having a high-voltage end for receiving an input voltage from the energy store, and a low-voltage end for providing the operating voltage lower than the input voltage.

According to the present invention, energy is stored at a voltage higher than the voltage level of the current loop, and energy is consumed at a lower voltage level, preferably low enough to comply with IS regulations.

By storing energy at a higher voltage, a different type of energy store (e.g. low capacity capacitor) may be used. As a consequence, the cost and start-up time of the energy store is significantly reduced.

Further, as the intermediate voltage is converted down to the operating voltage, the intermediate voltage can be allowed to vary significantly, enabling a more efficient use of the energy store compared to any corresponding energy store provided at operating voltage, which typically can only be allowed to vary a few tenths of volts.

Another advantage is that the first voltage conversion of the drive voltage enables driving of the level gauge at a lower available drive voltage (lower required lift-off voltage). This leads to a more robust measuring device, and a quicker and less costly installation.

It is acknowledged that some prior art (e.g. U.S. Pat. No. 6,972,584) also teaches storage of energy at an elevated voltage level compared to the voltage of the current loop. However, such solutions have been limited to devices operating at an elevated voltage, and thus always requiring a step-up converter. The present invention is related to applications where the operating voltage is lower than the voltage of the current loop, for example due to IS regulations. In such applications, the introduction of a step-up converter, followed by a step-down converter, has been considered too inefficient to be contemplated by the person skilled in the art. The present invention is based on the surprising realization that the above mentioned advantages with energy storage at a higher voltage more than compensate the drawback of the multiple voltage conversions.

While it is generally difficult to encapsulate the microwave unit, as the potting material may change the properties of the circuitry, the temporary energy store may advantageously be encapsulated to eliminate risk of explosion. This allows more freedom when designing the radar level gauge to fulfill safety requirements in explosion risk applications.

The interface can be adapted to receive power in an intrinsically safe manner, typically by means of an electrical barrier. The interface can be a two-wire interface, arranged both to transmit measurement data to a remote location and to receive power for operation of the system. For example, the interface can be a 4-20 mA industrial loop with superimposed digital communication (HART), a Fieldbus Foundation bus, or a Profibus. Such loops are widely used to power radar level gauges. Alternatively, the interface can be four-wire interface.

According to one embodiment, the microwave unit is adapted to emit pulsed signals, and the processing circuitry is adapted to determine a filling level of the container based on the time between the emission of a pulsed signal and the reception of the reflected signal. This type of measuring is referred to as pulsed measuring.

According to a second embodiment, the microwave unit is adapted to emit waves over a range of frequencies, and the processing circuitry is adapted to determine a filling level of the container based on a mix of the emitted signal and the reflected signal. This type of measuring is referred to as FMCW (Frequency Modulated Continuous Wave). The microwave unit may also be adapted to emit pulsed waves with a number of different frequencies, referred to as MFPW (Multiple Frequency Pulsed Wave).

The advantages listed above are generally obtainable in any process variable sensor in an application where there are restrictions in the power supply. According to a second aspect of the present invention, therefore, there is provided a power management circuitry as disclosed above, but for use generally in any processing variable sensor.

According to a third aspect of the present invention, there is provided a method for providing operating power to a sensor for detecting a process variable, comprising storing energy in an temporary energy store at an intermediate voltage higher than an operating voltage required by said sensor, and converting an output voltage from said temporary energy store down to said operating voltage.

This method allows efficient energy storage, while enabling intrinsically safe operation of the sensor.

BRIEF DESCRIPTION OF THE DRAWINGS

This and other aspects of the present invention will now be described in more detail, with reference to the appended drawings showing a currently preferred embodiment of the invention.

FIG. 1 is a functional block diagram of a radar level gauge in which the present invention can be implemented.

FIG. 2 is a schematic circuit diagram of a first embodiment of a power management circuitry according to a first embodiment of the invention.

DETAILED DESCRIPTION OF PREFERRED EMBODIMENTS

Figure 3:
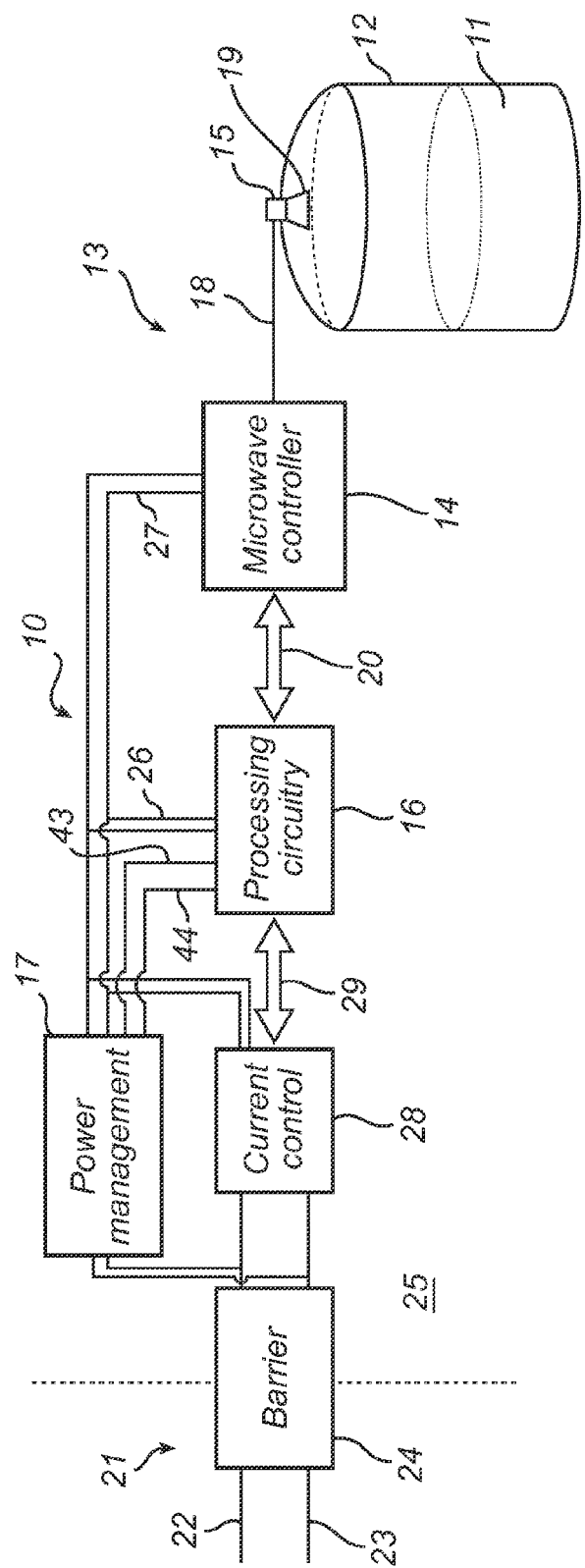
FIG. 3 is a functional block diagram of a radar level gauge provided with a power management circuitry according to an embodiment of the invention.

FIG. 1 shows a schematic block diagram of a radar level gauge 10, in which the present invention advantageously can be implemented. The radar level gauge is arranged to determine the position of the surface of a material 11 in a tank 12 (i.e. the filling level of the material 11). The radar level gauge 10 includes a microwave unit 13, adapted to emit waves into the tank, and to receive reflected microwaves, processing circuitry 16 for communicating with said microwave unit and for determining a measurement result based on a relation between transmitted and received microwaves, and a power management unit 17 for providing required power to the processing circuitry and the microwave unit 13.

The microwave unit 13 can comprise a microwave controller 14, a microwave emitter/receiver 15, and a signal transfer medium 18 connecting the emitter/receiver 13 to the controller 14. The controller 14 is connected to the processing circuitry 16 by a data bus 20, and is adapted to generate a microwave signal in accordance with control data from the processing circuitry 16. The controller 14 can comprise a transmitter, a receiver, a circulator and any control circuitry required to manage these components. Further, the controller 14 can comprise an A/D-converter for digitizing a tank signal, i.e. a signal received from the tank. The emitter/receiver 15 can, as shown in FIG. 1, include a free radiating antenna 19 in the top of the tank, or alternatively the emitter/receiver 15 can include a probe extending into the tank. The signal transfer medium 18 can be a wire or cable, but can also include more sophisticated wave guides. In case of a explosive or otherwise dangerous content in the tank 12, the signal transfer medium 18 may include an air tight seal passing through the tank wall. It is also possible that the controller 14 is connected directly to the emitter/receiver 15 with a suitable terminal, or that the emitter/receiver 15 is arranged on the same circuit board as the controller 14, in which case the signal transfer medium simply may be a track on the circuit board.

The system 10 is connected to an interface 21, for providing the system 10 with drive power, and possibly also for communicating a measurement result externally to the gauge system. In the illustrated example, the interface 21 is a two-wire interface, comprising two lines 22, 23, and an electrical barrier 24. The barrier 24 ensures that the area 25, in which the gauge system 10 is installed, is intrinsically safe, i.e. that power, current and voltage transferred through the interface 21 are kept below given limits, reducing the risk of hazard. An example of such a two-wire interface, at the same time providing drive power and communicating a measurement signal, is a 4-20 mA industrial loop.

The power management unit 17 is connected to one of the lines 22 and is adapted to convert the voltage in the two-wire interface (typically in the order of 5-20 V), into an operating voltage suitable for the circuitry 16 and the microwave driver 14, typically in the order of 3 V. In the simplest case, the power management unit 17 is a DC/DC step down converter and a smoothing capacitor. The power management unit is connected to the circuitry 16 via a line 26 and to the microwave driver 14 via a line 27.

Both lines 22, 23 are further connected to a current control unit 28, which is controlled by the processing circuitry 16 via a digital bus 29. The bus 29 also carries communication according to the HART protocol, to be superposed in the current in the loop 22, 23. The control unit 28 can be supplied with drive voltage from the power management unit 17.

In use, the processing circuitry 16 controls the microwave controller 14 to generate a measurement signal to be emitted into the tank 12 by the emitter/receiver 15. This signal can be e.g. a pulsed signal (pulsed level gauging or Multiple Frequency Pulsed Wave, MFPW), or a continuous signal with a frequency varying over a certain range (Frequency Modulated Continuous Wave, FMCW). The microwave emitter 15 acts as an adapter, enabling the signal generated in the controller 14 to propagate into the tank 12 as microwaves, which can be reflected by the surface of the material 11. A tank signal, i.e. the emitted signal and its echo, or a mix of emitted and reflected signals, is received by the emitter/receiver 15, and communicated to the microwave controller 14, where it is received and A/D converted. The digitized signal is then provided to the processing circuitry 16 via bus 20, and the processing circuitry 16 determines a measurement result based on a relation between the emitted and received waves. The measurement result is then communicated to the current control unit 28 via bus 29, and the current flowing through the current control unit 28 is regulated so that the total current in the current loop corresponds to the measurement result.

FIG. 2 shows a power management circuitry 30 according to a first embodiment of the invention. This circuitry can advantageously be used as or be incorporated in the power management unit 17 in FIG. 1.

According to this embodiment, the circuitry 30 includes a DC/DC step-up converter 31, here referred to as a boost converter, and a DC/DC step-down converter 32 connected in series. Both converters are preferably of the type that performs voltage conversion while essentially preserving the input power. (Of course, this is an ideal situation, in reality there will be a slight power loss due to conversion efficiency.) In between the two converters is provided a temporary energy store 33. As temporary energy store it is possible to use a reservoir capacitor 33 or any other type of element or combination of elements adapted to store electrical energy when a voltage is applied over it. Of course, the temporary energy store may include other components in stead of or in addition to the capacitor 33. For example, the temporary energy store may include a resistance in series with the capacitor 33, in order to safeguard the capacitor against peak voltages. The resistance should preferably be so small that the voltage drop across this resistance is negligible at the typical currents.

The circuitry 30 preerably also comprises a diode network 38, connected on one of the lines tio prevent energy from the energy store 33 from leaking back into the current loop 22, 23. The diode network 38 may comprise one or several diodes, and simply ensures that no current is allowed to flow in the opposite direction than intended.

The circuitry 30 preferably also includes a current limiting unit 39. The purpose of the current limiting unit 39 is to ensure that the power consumed by the power management unit 17 does not create a current in the loop exceeding the current value corresponding to the measurement value determined by the gauge. If, for example, the measurement result corresponds to a current in the loop of 5 mA, the current management unit 17 must not consume power so that the current in the loop exceeds 5 mA. This is ensured by the current limiting unit 39. In a very simple case, the limiting unit 39 is just a fixed current limiter, limiting the current to the minimum value of the current loop, e.g. 4 mA. Alternatively, the current limiting unit can be controlled in accordance with the currently available current in the loop. For this purpose, a control signal 40 can be provided from the control unit 28, or directly from the processing circuitry 16.

In some situations, the energy storage in the power management circuitry 30 is too large to fulfill the IS regulations. The circuitry 30 may then be encapsulated in order to make the device explosion proof.

One alternative is to encapsulate the entire RLG 10. However, it is generally difficult to meet explosion proof requirements, as the microwave unit 13 typically has a microwave cavity. Therefore, it may be desirable to encapsulate only the power management circuitry 30, while the rest of the RLG 10 is intrinsically safe, i.e. fulfils suitable IS standard. In this case, a barrier 34 (similar in function to the barrier 24) may be arranged on the output side of the circuitry 30, to ensure a limitation of extracted power and current.

The encapsulation may be made using a potting material. The encapsulation should preferably be free from cavities. By selecting a suitable potting material, more power can be dissipated in encapsulated small components and thus more power may actually be made available for consumption. The issue of surface temperature of specific components will in practice be transferred to an issue of whether the potting material is specified to withstand the maximum internal temperature. This means that the selected potting material needs to have good thermal conductivity or withstand high enough maximum temperatures (or both).

In use, the converter 31 converts the supply voltage $V_{drive}$ on line 22 (typically in the order of 5-20 V, depending on factors such as line resistance) up to a higher intermediate voltage $V_{int}$ (typically in the order of 25-30 V). Note that under some circumstances (with low available line voltage), the up transformation can be significant, and may be 4 or 5 times. Under other conditions, with higher available line voltage, the up-transformation may be less significant, and may be only around 25%. The capacitor 33 is therefore charged at the higher voltage $V_{int}$, ensuring a short charging time. As an example, energy in the order of mWs can be stored in the capacitor 33. At an intermediate voltage of 25 V, this corresponds to a capacitance in the order of tens of μF. Due to the relatively low requirement of capacitance, superior capacitor types like tantalum may be used, improving the robustness of the system. Such capacitors have limited temperature variation and better life span, especially at high temperatures.

The intermediate voltage $V_{int}$ is subsequently stepped down to a lower level $V_{op}$ by the step-down converter 32. The voltage $V_{op}$ can be essentially equal to the operating voltage of the processing circuitry 17 and/or microwave unit 13, typically in the order of 3 V.

When the processing circuitry demands more power than is available from the interface 21, the reservoir capacitor 33 will be discharged, thereby providing additional power needed e.g. for powering the microwave unit 13 during transmission. This will be especially important when the available current in the current loop is low (i.e. during periods of a low measurement value).

Optionally, the step-up converter 31 is provided with a control port 41, and the step-down converter 32 is provided with a control port 42, both arranged to receive a control signal 43. This control signal 43 permits by-passing the energy storage in circuitry 30.

FIG. 3 illustrates the system in FIG. 1, where the power management unit 17 is adapted to include a by-pass of power management circuitry 30 as mentioned above. The processing circuitry 16 here receives a monitor readout 44 from the power management unit 17 corresponding to the voltage $V_{int}$ in FIG. 2, and returns the control signal 43 to the power management circuitry 17. This control of the power management circuitry 17 provides the possibility to bypass the power storage in capacitor 33 during periods when no such storage is required, e.g. when a large current is available on the loop 22, 23, or when the processing circuitry 16 requires an immediate voltage, e.g. during startup.

The monitor readout also provides a possibility to optimize the duration of the measurement cycle, in order to ensure that sufficient charging of the temporary energy store can be effected between measurements. In principle, monitor readout 46 can be used to initialize the next measurement cycle as soon as the temporary energy store is sufficiently charged. Such control would make the duration of the cycle dynamic, so that it will depend on the available power, i.e. the current in the loop.

The person skilled in the art realizes that the present invention by no means is limited to the preferred embodiments described above. On the contrary, many modifications and variations are possible within the scope of the appended claims. For example, the power management circuitry according to the invention is not necessarily provided in only one place in the radar level gauge, but may be distributed in the system. For example, the circuitry described with relation to FIGS. 2 and 3 may be implemented directly in the microwave controller 14.

What is claimed is:

1. A radar level gauge using microwaves for measuring a filling level of a product in a tank, comprising:
    a microwave unit for transmitting microwaves into the tank, and receiving a reflection from the tank,
    processing circuitry connected to said microwave unit and arranged to determine said level based on a relation between transmitted microwaves and said reflection,
    a power interface for connecting said radar level gauge to an external power supply, and
    power management circuitry arranged to provide power at an operating voltage to said microwave unit and said processing circuitry,
    said power management circuitry including:
        a first voltage converter, having a low-voltage end for receiving a drive voltage from said power interface and a high-voltage end for supplying an intermediate voltage higher than said operating voltage,
        a temporary energy store arranged to be charged by said intermediate voltage,
        a second voltage converter, having a high-voltage end for receiving an input voltage from said energy store, and a low-voltage end for providing said operating voltage lower than said input voltage.

2. The radar level gauge according to claim 1, wherein said temporary energy store is encapsulated to fulfill explosion safety regulations.

3. The radar level gauge according to claim 1, wherein said power interface is arranged to receive power in an intrinsically safe manner.

4. The radar level gauge according to claim 1, wherein said power interface is a two-wire interface, arranged both to transmit measurement data to a remote location and to receive power for operation of the radar level gauge.

5. The radar level gauge according to claim 4, further comprising a current control unit which regulates the current in the two-wire interface in accordance with the measured level.

6. The radar level gauge according to claim 1, further comprising means for by-passing said temporary energy store, in dependence of a control signal.

7. The radar level gauge according to claim 6, wherein said processing circuitry is further arranged to receive a monitor signal indicative of the output voltage from the temporary energy store, and to provide said control signal in response to said monitor signal.

8. The radar level gauge according to claim 1, wherein said processing circuitry is further arranged to receive a monitor signal indicative of the output voltage from the temporary energy store, and to initialize a new measurement cycle in dependence of said monitor signal.

9. The radar level gauge according to claim 1, wherein the microwave unit which emits pulsed signals, and wherein the processing circuitry is adapted to determine a filling level of the container based on the time between the emission of a pulsed signal and the reception of the reflected signal.

10. The radar level gauge according to claim 1, wherein the microwave unit which emits waves over a range of frequencies, and wherein the processing circuitry is adapted to determine a filling level of the container based on a mix of the emitted signal and the reflected signal.

11. A method for providing operating power at an operating voltage to a sensor for detecting a process variable, comprising:
    receiving, at a low-end of a first voltage converter, a drive voltage from a power interface connected to a power supply,
    converting said drive voltage up to an intermediate voltage, higher than said operating voltage,
    charging a temporary energy store at said intermediate voltage,
    receiving, at the high-end of second voltage converter, an input voltage from said temporary energy store,
    converting said input voltage down to said operating voltage, and
    providing said operating voltage to said sensor.

12. The method according to claim 11, further comprising receiving said drive voltage in an intrinsically safe manner via an interface of said sensor.

13. The method according to claim 12, further comprising determining that energy storage is not required, and, in such case, by-passing said temporary energy store.

14. The method according to claim 12, further comprising initializing a new measurement cycle in dependence of a monitor signal indicative of the voltage across said temporary energy store.

15. The method according to claim 12, further comprising using energy from said energy store to transmit microwaves into a tank, and receive a reflection from the tank, and to determine a filling level of the tank based on a relation between transmitted microwaves and said reflection.

* * * * *